July 30, 1968 A. E. R. ARNOT 3,394,885
HEATING CONTROLS
Original Filed Nov. 14, 1962
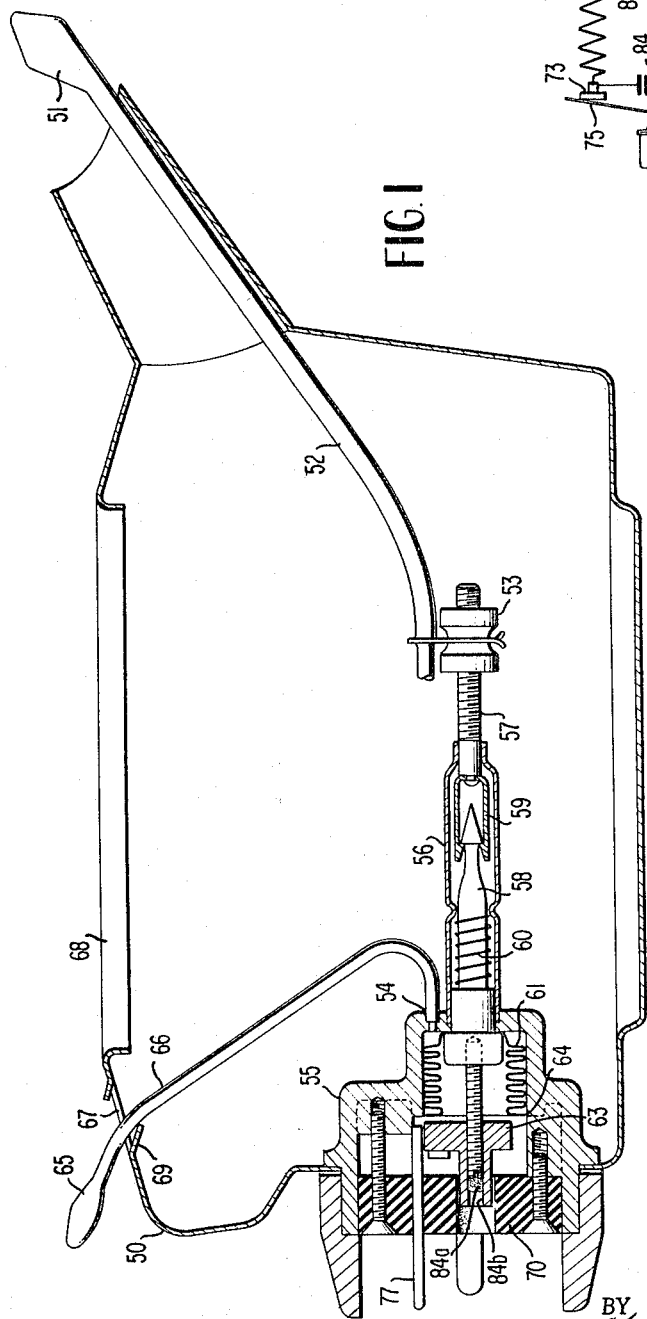
INVENTOR
ALFRED ERWIN REGINALD ARNOT
BY Kenyon, Palmer, Stewart & Estabrook
ATTORNEYS 3,394,885
HEATING CONTROLS
Alfred Erwin Reginald Arnot, The Bell House,
Hampshire, Baughurst, Basingstoke, England
Continuation of application Ser. No. 237,639, Nov. 14,
1962. This application Dec. 21, 1966, Ser. No. 605,527
Claims priority, application Great Britain, Nov. 15, 1961,
40,803/61; Dec. 16, 1961, 45,142/61; July 30, 1962,
29,133/62
11 Claims. (Cl. 236—32)

ABSTRACT OF THE DISCLOSURE

A container for heating a liquid to boiling and maintaining boiling. A heat-sensitive element is struck by hot vapour issuing freely from the container only when the liquid is boiling at or above a predetermined rate. When struck by hot vapour the heat-sensitive element causes the rate of supply of heat to be reduced to a rate just able to maintain boiling. When the heat-sensitive element is not struck, it allows heat to be supplied at a high rate to cause or restore boiling.

---

This application is a continuation of application Ser. No. 237,639, filed Nov. 14, 1962, now abandoned.

This invention relates to apparatus for boiling a liquid, in particular water, but the invention is applicable to the boiling of other liquids and also to the cooking of food in water.

The inconvenience of the steam produced by a kettle boiling vigorously for a substantial time, or the inconvenience of waiting and watching for a kettle or pot to boil to prevent boiling over or undue steam production, is well known. The provision of a temperature sensitive control to overcome such inconvenience involves many difficulties, and although it has been proposed to provide an electric kettle with a circuit breaker responsive to the heat of the steam produced upon boiling, this involves manual resetting of the circuit breaker to start the kettle boiling again, and may involve the addition of cold wtaer to the kettle in order to restore the heat responsive element to a temperature at which it can be reset.

There is accordingly a long-standing requirement for apparatus for boiling liquids in which the source of heat is controlled in such a way that vigorous boiling of the liquid is prevented, yet the liquid is maintained at boiling point, simmering gently.

The present invention provides apparatus for heating a liquid under atmospheric pressure, comprising a container for the liquid, said container having vapour outlet means for providing different trajectories of vapour according to the rate of boiling of said liquid, means for heating said liquid, heat sensitive means disposed in vapour trajectories corresponding to rates of simmer of the liquid of and above a selected value and control means operated by actuation of said heat-sensitive means for reducing the heat output of said heating means when the selected rate of simmer is attained and being further operative to provide an increased heat output when the rate of simmer falls below the selected value.

Said apparatus may comprise a wall or floor or bench mounted unit, or be portable as a kettle or steamer, or be associated with separate heating means; said container may comprise metal, glass or the like and may be provided with valve or spout or cover means for the introduction and/or removal of liquid; said vapour outlet means may comprise a hole or nozzle or deflector associated with said container or cover, or connected or connectable thereto; said vapour trajectories may vary according to the rate of boiling of said liquid by the distance of projection in any direction from a fixed outlet, or by the movement of a flexible or flexibly mounted outlet, or by the deflection of a movable deflector or the like; said means for heating said liquid may comprise electric or gas or liquid or solid fuel heater or burner or heat exchanger means; said heat sensitive means may comprise thermal expansion means such as bimetal material deflection or liquid or gas expansion, or change-of-state expansion means such as the liquefaction of wax or the vapourisation of liquid serving to deflect bellows or diaphragm or piston or Bourdon tube or mercury column means, or electrical resistance change means, and said heat sensitive means may be disposed directly in said vapour trajectory or be provided with heat conducting means to convey heat therefrom and/or thereto; said selected rate of simmer may be preset by the relative positioning of said heat-sensitive means and said vapour trajectory, or may be selectable by movement or change of shape or direction of said heat-sensitive means and or said vapour trajectory or the interposition of restrictor or baffle or deflector means therebetween; said control means may comprise switch means to modify the circuit of electric heater means, or valve means to reduce the supply of gas or liquid fuel, or mechanical movement means to reduce the air supply to solid fuel heater means or modify the characteristic of heat exchanger means.

There may also be provided a plurality of heating elements individually or interdependently operable by said control means; manually operated control means to reduce the output of or disconnect said means for heating, or to select thermostatic control means sensitive to temperature below the boiling point of said liquid; automatic liquid level control means operated by float or electric probe means; condensing means for liquid vapour by contact with cooling surfaces which may include said liquid introduction means, and means to return said condensate to said container or elsewhere; means to direct in-flowing cold liquid towards said heat-sensitive means to initiate a simultaneous high heating rate; operation signalling or measuring means comprising light or gauge or audible means; over-heat protection means which may comprise bimetal, or liquid or gas expansion or change of state means operative to reduce or cut off said heat output in conjunction with said control means or alternative control means, and adapted to be self-resetting or manually resettable when cooled; thermal insulation means such as plastics foam or asbestos or glass fibre or vacuum chamber enclosing wholly or partially said liquid container; and heat reduction or cut-out means responsive to inadequate liquid level.

The invention will now be particularly described, by way of example only, with reference to some embodiments of liquid heating apparatus shown in the accompanying drawings in which:

FIGURE 1 is a vertical section through an electric kettle having control means to maintain simmering after boiling, and in which the heating and control means comprise a replaceable unit assembly;

FIGURES 2 and 3 show details of the control means of FIGURE 1;

FIGURE 4 illustrates diagrammatically the circuit of the control means of the kettle;

FIGURE 1 shows an embodiment of the invention as applied to a kettle, and illustrates alternative positions of the heat sensitive means. As shown, the kettle 50 is provided with an electric heating element, e.g. of 3 kilowatts rating and a second or auxiliary element of much lower rating, e.g. 100 watts. As in the previous embodiment of FIGURE 1, the second element is provided to take over from the main element when the water has come to the boil and therefore the rating of the second element is preferably such as to be able to maintain the water at boiling point and simmering gently by replacing the heat losses from the kettle in average conditions. Since the appearance and construction of an electric kettle heater element is well known, neither element has been illustrated in the drawing, but the socket from which the elements extend has been shown since it embodies the control means and heat sensitive means for switching from the main to auxiliary element. As shown, the socket 55 supports an over-heat protection device comprising a tube 56, which in one embodiment may carry a threaded extension 57, and which is in close thermal contact with one or both elements for instance by silver-soldering. An operating plunger 58 is normally held by a bimetallic claw 59 against the force of a compressed spring 60, and in the absence of sufficient water in the kettle the tube 56 overheats, the claw 59 opens to release plunger 58, and the pressure of spring 60 acts against a metal bellows 61, soldered into the socket 55 at 64, to compress it against a screw-threaded rod 62 on which a switch-operating insulated member 63 is fitted.

The heat sensitive means comprises in one embodiment a capsule 51, containing a material which will be discussed later, the capsule being connected through a capillary tube of low thermal conductivity such as stainless steel to the operative enclosure of the bellows 61 by brazing or the like at 54. The capsule 51 projects from the spout of the kettle by a distance which may be preset by a screwed adjustor on the threaded extension 57, and because the main heater elements will be operative unless the steam trajectory from the spout touches the capsule, a further extension of the capsule will maintain a faster average rate of simmer beyond the rating of the auxiliary element by occasional switching on of the main element.

In an alternative embodiment, the heat-sensitive means comprises a capsule 65 connected by a stainless steel tube 66 to the socket 55 at the junction 54, and extending through a nozzle-shaped opening 67 which may include for assembly purposes a slot communicating with the lid opening 68, and a depression 69 for returning condensate to the kettle interior. The capsule is so disposed, and the nozzle so shaped, that the capsule is out of the path of hot vapour passing slowly upwardly through the nozzle 67 whilst the water is not boiling, but is in the path of hot vapour projected through the nozzle 67 when the water is boiling at or above a designated simmering rate.

The material contained in the capsule 51 or 65 has a vapour-pressure/temperature characteristic such that it will not generate sufficient pressure to operate the control means when subjected to the maximum temperature of the capsule due to ambient and conducted heat without the presence of hot vapour, but will generate sufficient pressure to compress the bellows and operate the switch means to cut out the main element when the capsule temperature is raised by contact with hot vapour. For example, an average design indicates a steady capsule temperature of about 65° C. when the kettle contains water at near boiling point and heat is rising from the body and being conducted up the tube 66. As soon as boiling starts, the capsule is enveloped in steam and its temperature rises rapidly to near 100° C., but if gentle simmering is initiated so that hot vapour continues more or less to touch the capsule its temperature is of the order of 75–85° C.; a further reduction in the rate of simmering, with loss of contact between the hot vapour and the capsule, produces a rapid drop of capsule temperature to about 65° C. again. Thus methyl alcohol, having a boiling point of 64.7° C. at atmospheric pressure, will merely balance the atmospheric pressure on the bellows when the water in the kettle is not steaming though practically boiling; sudden rapid temperature rise of the capsule to near 100° C. will produce a pressure in the bellows enclosure of about 36 lbs./sq. in. above atmospheric providing adequate force to compress the bellows and operate switch mechanism, and subsequent simmering at 85–75° C. will maintain a pressure of some 17–6 lbs./sq. in. which is also sufficient to operate or maintain the switching condition, the switch operating force, bellows area and spring rate being chosen to accord with these pressure conditions. Other suitable capsule filling liquids having appropriate temperature/pressure characteristics are commonly available, but in order to prevent eventual dissociation of the liquid or its chemical combination with the materials comprising its enclosure, there may be used fluorocarbon liquids of great stability and inertness having boiling points at atmospheric pressure which may be chosen from the range 60° C.–99° C.

Apart from the small quantity of heat-sensitive liquid in the capsule 51 or 65, which may be deliberately limited to ensure that the full vapour pressure cannot be developed above say 85° C., the remainder of the enclosure is preferably evacuated so that the temperature rise of the submerged system during heating has no effect on the pressure in the enclosure. Liquid from the capsule which may have transferred to the lower parts of the enclosure during out-of-use periods will vaporise and recondense in the capsule as the system warms without generating an operating pressure.

It will be understood that the capsule could be filled with liquid or wax or gas, and the remainder of the enclosure with the same or other filling, in which case the volumes and expansions of the parts must be proportioned so that expansion of the submerged portions up to boiling temperature conditions does not cause operation of the switch, whilst the additional expansion of the material in the capsule, which may be of considerable volume, will cause operation of the switch when the capsule is subjected to simmering vapour.

The socket 55 is closed on its outer side by an insulating disc 70 supporting an earthing pin 77, and two pins 71 and 72 shown in FIGURES 2 and 3 for connection to the electricity supply. The heater elements are each provided with silver-headed terminal contacts, the terminals 73 and 74 of the main element being engaged by resilient contact arms 75 and 76 connected respectively to the contact pins 71 and 72 and arranged to be lifted out of engagement by arms 82 and 83 on the switch operating member 63. The auxiliary element has two terminals 78 and 79, the terminal 78 being connected to the pin 71 by a spring contact arm 80 whilst the terminal 79 is connected by a bridging member 81 to the terminal 74, thus initially connecting the two heater elements in parallel. A spark suppression condenser 84 may be connected between the terminals 73 and 78 to reduce radio interference or contact wear when contacts 73 and 75 separate as shown in FIIGURE 4.

The arms 82 and 83 are positioned stepwise on the member 63 so that compression of the bellows will first raise contact arm 75 away from terminal 73, and subsequently will engage the contact arm 76 to move it away from terminal 74.

Thus in operation of the kettle, as the water reaches boiling point and stem issuing from the nozzle 67 impinges on the capsule 65, or from the spout onto capsule 51, the pressure increase on the bellows caused by the heating of the material in the capsule will move the switch-operating member 63 and cause the arm 82 to open contact 73 of the main heater element. The auxiliary element will however be left in circuit, and its heat output will act preferably to maintain the water temperature at boiling point and simmering gently, but if insufficient vapour is generated to keep the capsule hot and maintain switch-operating pressure on the bellows, the main element will again be brought into circuit until adequate boiling is re-established. If however the kettle is switched on or left on with an insufficient water level so that overheating takes place, the plunger 58 under the action of the spring 60 as previously described will act with sufficient force to overcome the negative pressure in the bellows enclosure, the stiffness of the bellows and the two contact arms 75 and 76 so that the arm 83 will open the contact 74, thus open-circuiting both elements. It will be seen that the high pressure which may be generated in the capsule when enveloped in excessive steam may also move the switch arms sufficiently to open contact 74 and further reduce the heat input.

Initial setting of the switching position is established by slackening the adjusting screw 62, boiling water vigorously in the kettle to heat the parts, and then allowing the steam to subside until the capsule 65 or 51 is at a substantially steady temperature unaffected by projected vapour. The screw 62 is then screwed in until the contact 73 is just broken (as determined by a continuity test across pins 71 and 72), then slackened back about half a turn and sealed with a solidifying adhesive 84a in the hole 84b. The end of the switch-operating member 63 is left accessible for manual resetting of the overheat trip, which is accomplished after the element has cooled by pushing back the switch member 63 until the plunger 58 is again gripped by the claw 59.

It will be understood that in each of the above described embodiments, the auxiliary element could be omitted, but in this event a reduced level or average heat output sufficient to keep the water simmering gently is preferably arranged by other means such as voltage reducing means or periodic current interrupting means, in order to reduce or eliminate cyclic operation of the main element and the production of excessive steam due to the thermal storage which it must dissipate after each operation.

What is claimed is:

1. Apparatus for heating a liquid under atomspheric pressure, comprising a container for the liquid, said container having an outlet from the upper portion thereof for hot vapour, said outlet being so formed that hot vapours evaporated from the liquid at different rates of boiling will follow different free space trajectories from the outlet, means for heating the liquid, heat-sensitive means so disposed as to intercept free space vapour trajectories corresponding to rates of boiling of the liquid at and above a predetermined value, but to be out of the path of hot vapour evaporated from the liquid at temperatures thereof below the boiling point and control means operative in response to actuation of said heat-sensitive means by said vapour to maintain a reduced heat output of said heating means and to increase said heat output if the rate of boiling falls below said predetermined value.

2. Apparatus according to claim 1 wherein when said reduced heat output is inadequate to maintain said predetermined rate of boiling, said control means operates cyclically in response to said heat-sensitive means to maintain an average rate of boiling corresponding to said predetermined rate.

3. Apparatus according to claim 1 wherein when said reduced heat output is sufficient to maintain said predetermined rate of boiling, said heat-sensitive means is in its actuated state after actuation by said hot vapour.

4. Apparatus according to claim 1 wherein said heating means is an electric heating element and said control means comprises input power supply reducing means.

5. Apparatus according to claim 1 wherein said heating means is fuel burning, and said control means comprises fuel flow control means.

6. Apparatus according to claim 1 wherein said heat-sensitive means comprises a bimetallic member.

7. Apparatus according to claim 1 wherein said heat-sensitive means comprises thermally expandable material operative upon pressure-deflectable means.

8. Apparatus according to claim 1 wherein the location of said heat-sensitive means with respect to said free space trajectory of hot vapour is adjustable, thereby to change the selected minimum rate of boiling.

9. Apparatus according to claim 1 wherein said heating means comprises a plurality of heating elements selectively controllable by said control means.

10. Apparatus according to claim 1 including heat-reducing means responsive to over-heating of a part of said apparatus.

11. Apparatus according to claim 4 wherein said electric heating means, said heat-sensitive means, said control means operative in response to actuation of said heat-sensitive means, and heat-reducing means operative by over-heating of said electric heater means comprise a unit assembly replaceably mounted in said container.

References Cited

UNITED STATES PATENTS 2,371,516   3/1945   Griffiths _____ 236—33

FOREIGN PATENTS 422,382   3/1911   France.

FREDERICK L. MATTESON, Jr., *Primary Examiner.*

D. A. TAMBURRO, *Assistant Examiner.*